United States Patent
Neuvirth-Telem et al.

(10) Patent No.: US 10,320,817 B2
(45) Date of Patent: Jun. 11, 2019

(54) SYSTEMS AND METHODS FOR DETECTING AN ATTACK ON AN AUTO-GENERATED WEBSITE BY A VIRTUAL MACHINE

(71) Applicant: Microsoft Technology Licensing, LLC, Redmond, WA (US)

(72) Inventors: Hani Neuvirth-Telem, Tel Aviv (IL); Elad Yom-Tov, Hoshaya (IL); Royi Ronen, Tel Aviv (IL); Daniel Alon Hilevich, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 210 days.

(21) Appl. No.: 15/352,714

(22) Filed: Nov. 16, 2016

(65) Prior Publication Data
US 2018/0139215 A1    May 17, 2018

(51) Int. Cl.
*G06F 21/50* (2013.01)
*H04L 29/06* (2006.01)
(Continued)

(52) U.S. Cl.
CPC ........ *H04L 63/1416* (2013.01); *G06F 16/951* (2019.01); *G06F 21/577* (2013.01);
(Continued)

(58) Field of Classification Search
CPC . H04L 63/1416; H04L 63/1441; H04L 67/02; H04L 67/146; H04L 63/1425; G06F 17/30864; G06F 21/577
See application file for complete search history.

(56) References Cited

U.S. PATENT DOCUMENTS

| | | | |
|---|---|---|---|
| 7,441,429 B1 * | 10/2008 | Nucci | H04L 63/1416 370/230 |
| 7,523,499 B2 | 4/2009 | Wilkins et al. | |

(Continued)

FOREIGN PATENT DOCUMENTS

| EP | 2882159 A1 | 6/2015 |
|---|---|---|
| WO | 2016020660 A1 | 2/2016 |

OTHER PUBLICATIONS

"Automatically generated content", Jul. 31, 2016, obtained online from <https://web.archive.org/web/20160731185136/https://varvy.com/auto-generated.html>, retrieved on Aug. 30, 2018.*

(Continued)

*Primary Examiner* — Farid Homayounmehr
*Assistant Examiner* — Zhimei Zhu
(74) *Attorney, Agent, or Firm* — Workman Nydegger

(57) ABSTRACT

A system for detecting an attack by a virtual or physical machine on one or more auto-generated websites is provided. The system includes a processor, a memory, and an application. The application is stored in the memory and includes instructions, which are executable by the processor. The instructions are configured to: access an index of a search engine server computer and determine uniform resource locators (URLs) of auto-generated websites, where the auto-generated websites include the one or more auto-generated websites; and access Internet protocol (IP) address-URL entries stored in a domain name system server computer. The instructions are also configured to: determine a first feature based on the URLs of the auto-generated websites and the IP address-URL entries; collect header data of packets transmitted to or received from the virtual or physical machine; determine a second feature based on the first feature and the header data; based on the second feature, generate a value indicative of whether the first virtual or physical machine has attacked the one or more auto-gener- (Continued)

ated websites; and perform a countermeasure based on the value.

14 Claims, 6 Drawing Sheets

(51) Int. Cl.
    *G06F 16/951* (2019.01)
    *H04L 29/08* (2006.01)
    *G06F 21/57* (2013.01)
(52) U.S. Cl.
    CPC ...... *H04L 63/1425* (2013.01); *H04L 63/1441* (2013.01); *H04L 67/02* (2013.01); *H04L 67/146* (2013.01)

(56) References Cited

U.S. PATENT DOCUMENTS

| | | | |
|---|---|---|---|
| 8,521,667 B2 | 8/2013 | Zhu et al. | |
| 9,430,646 B1* | 8/2016 | Mushtaq | G06F 21/554 |
| 9,930,012 B1* | 3/2018 | Clemons, Jr. | H04L 63/0272 |
| 2006/0184960 A1* | 8/2006 | Horton | G06Q 30/00 725/25 |
| 2007/0168465 A1* | 7/2007 | Toppenberg | G06Q 30/02 709/218 |
| 2007/0245417 A1* | 10/2007 | Lee | H04L 63/1458 726/22 |
| 2008/0147885 A1* | 6/2008 | Bessis | H04L 29/12066 709/250 |
| 2008/0301139 A1* | 12/2008 | Wang | H04L 63/1441 |
| 2012/0102563 A1* | 4/2012 | Kim | H04L 43/12 726/13 |
| 2012/0291099 A1* | 11/2012 | Grube | H04L 67/1097 726/3 |
| 2013/0055309 A1* | 2/2013 | Dittus | H04N 21/2668 725/35 |
| 2013/0333038 A1 | 12/2013 | Chien | |
| 2014/0115037 A1* | 4/2014 | Liu | H04L 65/1016 709/203 |
| 2014/0317738 A1* | 10/2014 | Be'ery | H04L 63/14 726/23 |
| 2015/0269156 A1* | 9/2015 | Awadallah | G06F 17/3053 707/732 |
| 2015/0288647 A1* | 10/2015 | Chhabra | H04L 61/1511 709/245 |
| 2015/0326600 A1* | 11/2015 | Karabatis | H04L 63/1433 726/25 |
| 2016/0004580 A1* | 1/2016 | Momot | H04L 63/1416 714/47.3 |
| 2016/0036837 A1* | 2/2016 | Jain | H04L 63/1416 726/23 |
| 2017/0214702 A1* | 7/2017 | Moscovici | H04L 63/1416 |

OTHER PUBLICATIONS

Najafabadi, et al., "Machine Learning for Detecting Brute Force Attacks at the Network Level", In Proceedings of the IEEE International Conference on Bioinformatics and Bioengineering, Nov. 10, 2014, pp. 379-385.
44, Issue 5, "SSH Compromise Detection using NetFlow/IPFIX", In Journal of ACM SIGCOMM Computer Communication Review archive, Oct. 2014, : HOFSTEDE, et al pages.
Jake, "Tracking brute force Attacks", https://www.plixer.com/blog/network-monitoring/tracking-brute-force-attacks/, Published on: Nov. 5, 2014, 2 pages.
Najafabadi, et al., "Detection of SSH Brute Force Attacks Using Aggregated Netflow Data", In Proceedings of IEEE 14th International Conference on Machine Learning and Applications, Dec. 9, 2015, pp. 283-288.
"Top Rated Plugins to Detect Malware in Your WordPress Website", http://www.wpexplorer.com/top-rated-plugins-detect-malware-wordpress-website/, Published on: Aug. 11, 2016, 17 pages.
Vizvary, et al., "Flow-based detection of RDP brute-force attacks", In Proceedings of 7th International Conference on Security and Protection of Information, Sep. 9, 2014, 6 pages.
Vykopal, Jan, "Flow-based Brute-force Attack Detection in Large and High-speed Networks", In Thesis of Masaryk University, Oct. 5, 2016, 107 pages.
ELI, "Anti-Malware and Brute-Force Security by ELI", http://wordpress.alternativelist.com/plugin/anti-malware-and-brute-force-security-by-eli-alternative-and-similar-wordpress-plugins-345.html, Retrieved on: Oct. 5, 2016, 2 pages.
"Blocking Brute Force Attacks", http://www.cs.virginia.edu/~csadmin/gen_support/brute_force.php, Published on: Sep. 11, 2016, 2 pages.
"International Search Report and Written opinion issued in PCT Application PCT/US17/060735", dated Feb. 5, 2018, 13 Pages.

* cited by examiner

SYSTEMS AND METHODS FOR DETECTING AN ATTACK ON AN AUTO-GENERATED WEBSITE BY A VIRTUAL MACHINE

FIELD

The present disclosure relates to attack detection systems and methods, and more particularly to attack detection systems and methods for detecting attacks on auto-generated websites.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Website building tools, such as WordPress®, Wix®, Weebly®, Squarespace®, Shopify®, and BigCommerce® website building tools, can be used to auto-generate websites and/or web content (e.g., blogs). An owner of an auto-generated website can configure the website through a dedicated administrator page at a default uniform resource locator (URL). The default URL is typically protected and accessible by entering a username and a password. Since the administrator pages are accessible by entering usernames and passwords, "brute-force" attacks on the websites can occur. In a brute-force attack, an attacker iteratively attempts to access an administrator page by entering different usernames and passwords until access is granted. Once access is granted, the attacker may modify the website, plant viruses, and/or gain access to data corresponding to the website and/or the owner of the website.

SUMMARY

A system for detecting an attack by a virtual or physical machine on one or more auto-generated websites is provided. The system includes a processor, a memory, and an application. The application is stored in the memory and includes instructions, which are executable by the processor. The instructions are configured to: access an index of a search engine server computer and determine uniform resource locators (URLs) of auto-generated websites, where the auto-generated websites include the one or more auto-generated websites; and access Internet protocol (IP) address-URL entries stored in a domain name system server computer. The instructions are also configured to: determine a first feature based on the URLs of the auto-generated websites and the IP address-URL entries; collect header data of packets transmitted to or received from the virtual or physical machine; determine a second feature based on the first feature and the header data; based on the second feature, generate a value indicative of whether the first virtual or physical machine has attacked the one or more auto-generated websites; and perform a countermeasure based on the value.

In other features, a non-transitory tangible computer readable medium storing instructions executable by a processor for detecting an attack by a virtual or physical machine on one or more auto-generated websites is provided. The instructions include: determining uniform resource locators (URLs) of auto-generated websites based on an index of a search engine server computer, where the auto-generated websites include the one or more auto-generated websites; accessing Internet protocol (IP) address-URL entries in a domain name system server computer; determining a first feature based on the URLs of the auto-generated websites and the IP address-URL entries; collecting header data of packets transmitted to or received from the first virtual or physical machine; determining a second feature based on the first feature and the header data; based on the second feature, generating a value indicative of whether the virtual or physical machine has attacked the one or more auto-generated websites; and performing a countermeasure based on the value.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Auto-generated websites may be generated by website building tools for virtual machines (VMs) and/or physical machines (PMs). The VMs and the PMs may be implemented in a cloud-based network. Cloud-based networks allow computer processing and storing needs to be moved from on premises networks to hybrid cloud or fully cloud-based networks while satisfying data security access requirements. The auto-generated websites can be attacked using brute-force techniques directly from client computers or indirectly via the VMs and PMs. The VMs may be owned by an attacker that remotely causes the VMs to perform malicious activity, or a client that is unaware of the malicious activity. For example, an attacker may gain access to a first VM of a first client and cause the first VM to perform brute-force attacks on an auto-generated website. The auto-generated website may be hosted by a second VM of a second client (or owner of the auto-generated website). The attacker gains access to the first VM of the first client and causes the first VM to perform a brute-force attack on the auto-generated website without the first client becoming aware of the malicious activity.

The examples set forth below include systems and methods for detecting malicious activity on auto-generated websites. The examples include training a classification learning algorithm to detect malicious activity. Once trained, the classification learning algorithm is then used to detect and notify owners of VMs and/or service provider owners of PMs of malicious activity. An attack detection application is implemented in a cloud-based network and is used to monitor client computers, VM activity and PM activity and to inform owners of VMs and server provider owners of PMs of detected malicious activity, such that one or more countermeasures can then be performed to stop the malicious activity.

In some examples, the attack detection application monitors header information in packets transmitted by VMs and PMs. This includes obtaining IP addresses of the packets. The attack detection application also accesses a search engine index to determine which URLs are associated with hosting auto-generated websites, and a domain name system (DNS) server computer to correlate the IP addresses of the packets to the URLs associated with hosting the auto-generated websites. Based on this correlation and other determined features, the attack detection application determines via the classification learning algorithm whether a VM and/or PM is attacking an auto-generated website. In some examples, the attack detection application then informs the owner of the VM and/or PM of the malicious activity to prevent further attacks on and/or to block access to the auto-generated website.

Figure 1:
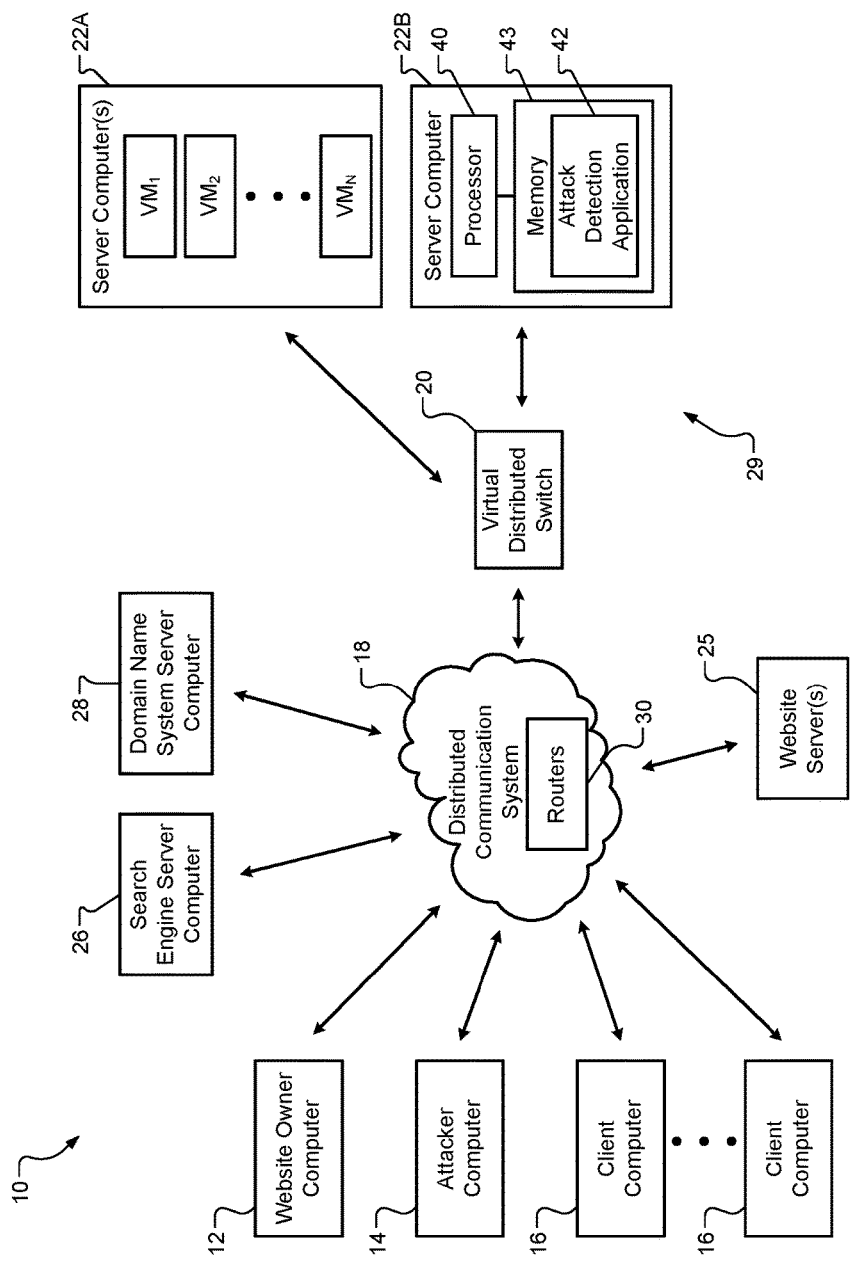
FIG. 1 is a functional block diagram of an example of an attack detection system including an attack detection application in accordance with an embodiment of the present disclosure.

FIG. 1 shows an attack detection system 10 that includes: a website owner computer 12, an attacker computer 14, and other computers 16 (e.g., client computers); a distributed communication system 18; one or more virtual distributed switches (one virtual distributed switch 20 is shown); one or more server computers 22A and a server computer 22B (collectively server computers 22); one or more website server(s) 25; a search engine server computer 26; and a DNS server computer 28. In some examples, the virtual distributed switch 20 and the server computer 22B are implemented in a cloud-based network 29.

The cloud-based network 29 may be implemented by a cloud service provider and, in an embodiment, includes client virtual machines, network appliances and application server computers. Examples of network appliances include routers, switches, firewalls, proxy server computers, World Wide Web (or Web) server computers, wide area network (WAN) accelerators, intrusion detection system (IDS) devices, and intrusion prevention system (IPS) devices. The network appliances provide intermediary services between the application server computers and client computers. The client computers can be implemented in the cloud-based network as VMs and/or PMs or can be located on premises. The network appliances and application server computers may be implemented as one or more VMs implemented in the cloud-based network.

The cloud-based network 29 may include one or more of the server computers 22A and 22B. The cloud-based network 29 further includes resources that may be shared by the computers 12, 14, 16. The cloud service provider provisions the resources (such as software applications having corresponding executable code, server computer processing time, and/or storage) via the cloud-based network 29. The one or more server computers 22A may include $VM_{1-N}$ and may perform as PMs. The server computer 22B includes a processor 40 that executes an attack detection application 42, which is stored in memory 43. On or more of the $VM_{1-N}$ may be implemented in the server computer 22B.

The computers 12, 14, 16 may be privately owned by different individuals and/or entities. The website owner computer 12 may be owned by an owner of a VM (e.g., one of $VM_{1-N}$ implemented by the one or more server computers 22A). The VM may host an auto-generated website. The auto-generated website and other auto-generated websites may be generated by the one or more website servers 25. The attacker computer 14 and/or a VM or a PM associated with an owner of the attacker computer 14 initiates a brute-force attack on the auto-generated website. The computers 16 may access the auto-generated website and own other VMs (e.g., other ones of the $VM_{1-N}$) implemented by the one or more server computers 22A.

The distributed communication system 18 includes routers 30, which direct packets between the computers 12, 14, 16 and the virtual distributed switch 20. The distributed communication system 18 may include a network, such as the Internet, a local area network (LAN), a wireless local area network (WLAN), and/or a wide area network (WAN) such as the Internet. The virtual distributed switch 20 monitors and routes packets to/from the $VM_{1-N}$ and the server computers 22A and 22B. The virtual distributed switch 20 may be a NetFlow® device and/or a device that operates according to an Internet protocol flow information export (IPFIX) protocol. The virtual distributed switch 20 collects IPFIX data from the packets. The packets include headers, which include IPFIX data, such as source and destination IP addresses, source and destination port identifiers, synchronization (SYN) transmission control protocol (TCP) flags, etc. The IPFIX data does not include universal resource locators (URLs) and/or content (i.e. payload data) of the packets.

During operation, the attack detection application 42 accesses the search engine server computer 26 and the DNS server computer 28. The search engine server computer 26 and/or the DNS server computer 28 may be accessed by the server computer 22B via the distributed communication system 18, the routers 30 and the virtual distributed switch 20. The attack detection application 42 monitors activity of the $VM_{1-N}$ and PMs by monitoring IPFIX data associated with the packets transmitted to/from the $VM_{1-N}$ and the PMs. Based on the IPFIX data and the information received from the search engine server computer 26 and the DNS server computer 28, the attack detection application 42 determines whether one or more of the $VM_{1-N}$ and/or PMs are attacking one or more auto-generated websites. The attack detection application 40 informs the owners of the VMs and PMs and/or the auto-generated websites of malicious activity and/or brute-force attacks. This allows the owners, the VMs, the PMs and/or the auto-generated websites to take appropriate actions to prevent further attacks on and/or to block access to the auto-generated websites and/or the VMs and PMs hosting the auto-generated websites. Although the attack detection application 42 is shown as being implemented in the server computer 22B, the attack detection application 42 may be implemented in the same server computer as one or more of the $VM_{1-N}$.

Figure 2:
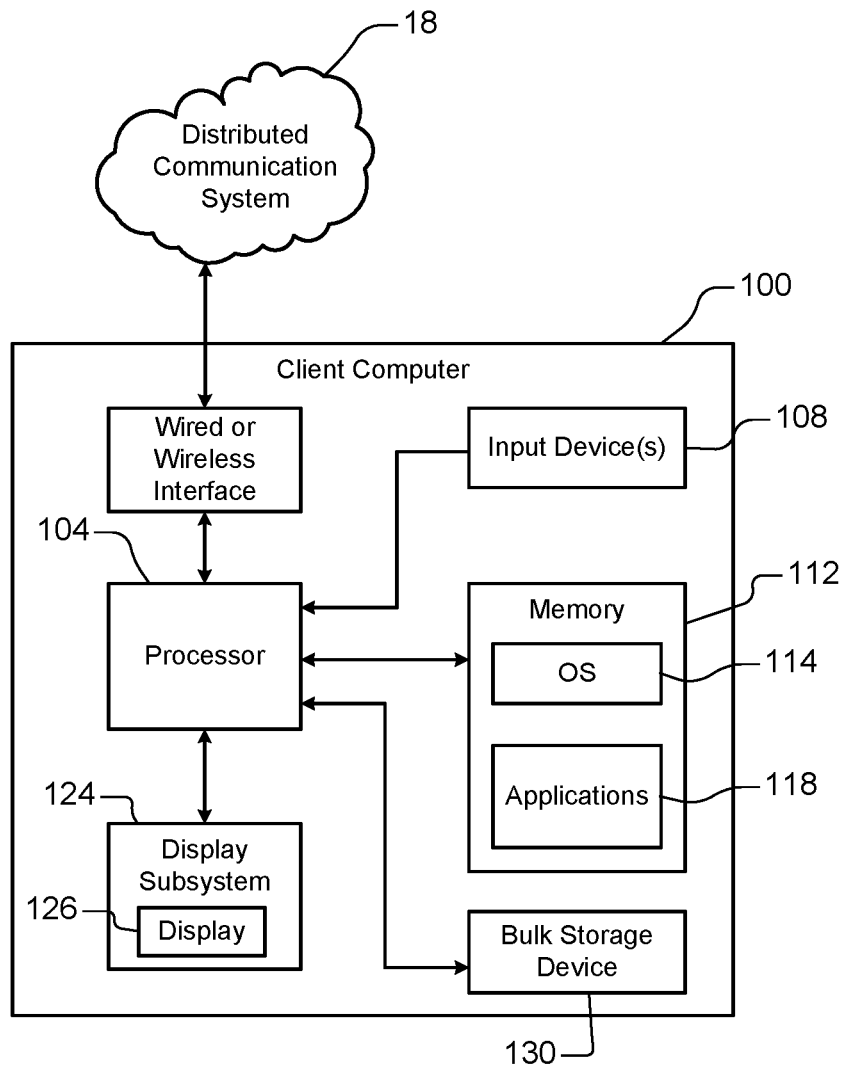
FIG. 2 a functional block diagram of an example of a client computer in accordance with an embodiment of the present disclosure.

In FIG. 2, a simplified example of a client computer 100 is shown. The computers 12, 14, 16 of FIG. 1 may be implemented as the computer 100. The computer 100 includes a central processing unit (CPU) or processor 104 and an input device 108 such as a keypad, touchpad, mouse, etc. The computer 100 further includes memory 112 such as volatile or nonvolatile memory, cache or other type of memory. The computer 100 further includes bulk storage device 120 such as flash memory, a hard disk drive (HDD) or other bulk storage device.

The processor 104 of the computer 100 executes an operating system 114 and one or more applications 118. For example, the applications 118 may include a browser. The computer 100 further includes a wired interface (such as an Ethernet interface) and/or wireless interface (such as a Wi-Fi, Bluetooth, near field communication (NFC) or other wireless interface (collectively identified at 120)) that establishes a communication channel over the distributed communication system 18. The computer 100 further includes a display subsystem 124 including a display 126.

Figure 3:
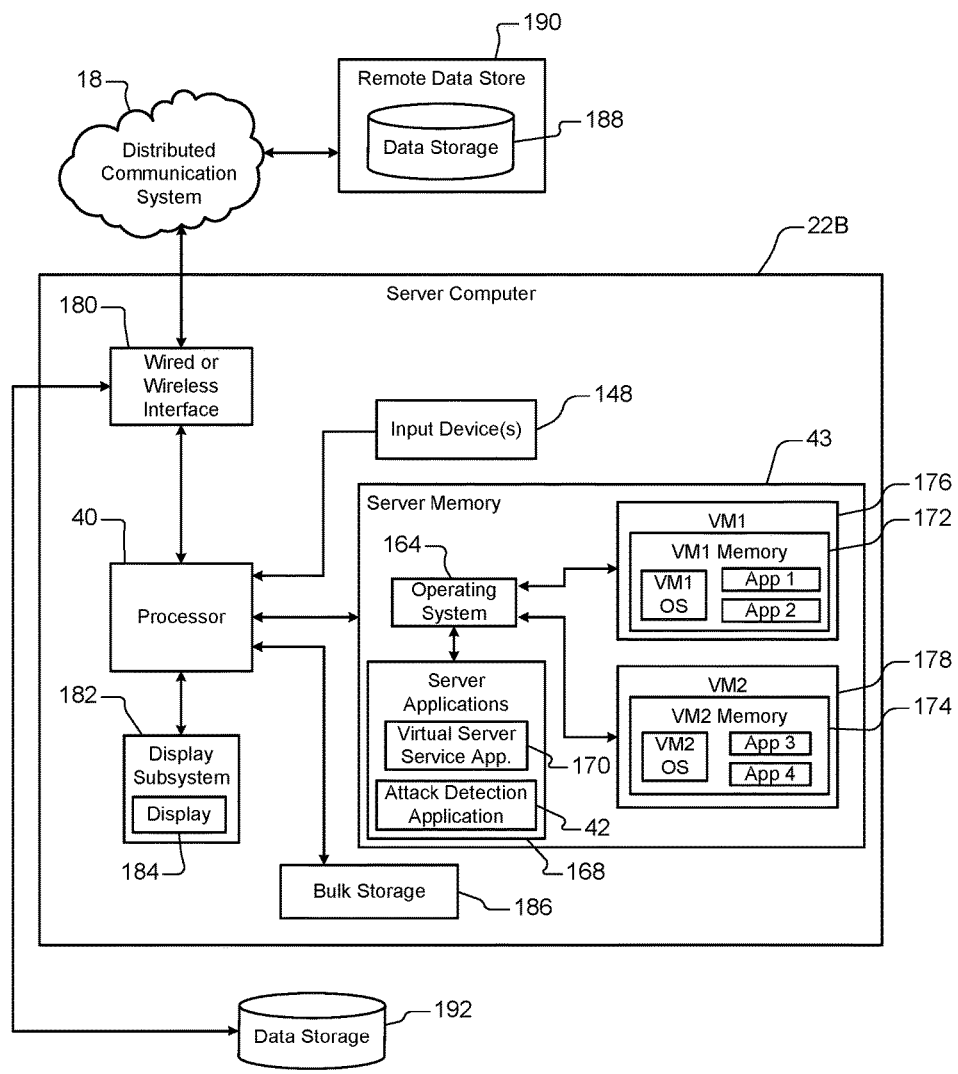
FIG. 3 is a functional block diagram of an example of a server computer incorporating applications in accordance with an embodiment of the present disclosure.

In FIG. 3, an example of the server computer 22B is shown. The server computers 22A of FIG. 1 have a similar architecture as the server computer 22B. The server computer 22B includes one or more processors and an input device 148 such as a keypad, touchpad, mouse, etc. The server computer 22B further includes the server memory 43 such as volatile or nonvolatile memory, cache or other type of memory. The processor 40 executes an operating system (OS) 164 and one or more server applications 168 and/or VM applications. Examples of server applications include the attack detection application 42 and a virtual server service application 170, which is implemented in a virtualization layer and is executed along with the OS 164. The virtual server service application 170 creates a virtual environment in which VM (or guest) OSs (e.g., VM1 OS and VM2 OS) run. Example VM applications App 1, App 2, App 3, and App 4 are shown as being implemented in VM memories 172, 174 of VMs 176, 178, respectively. The VM applications may include instances of auto-generated websites, network appliances, and/or other VM applications. VM applications App1-4 are shown as examples. Each of the VM memories may include one or more VM applications.

The server computer 22B further includes a wired or wireless interface 180 that establishes a communication channel over the distributed communication system 18. The server computer 22B further includes a display subsystem 182 that includes a display 184. The server computer 22B may further include a bulk storage device 186 such as flash memory, a hard disk drive (HDD) or other local or remote storage device. The processor 40 may also access a remote storage 188 of a remote data store 190 via the interface 180 and the distributed communication system 18, or a data storage 192, such as a database, via the interface 180.

Figure 4:
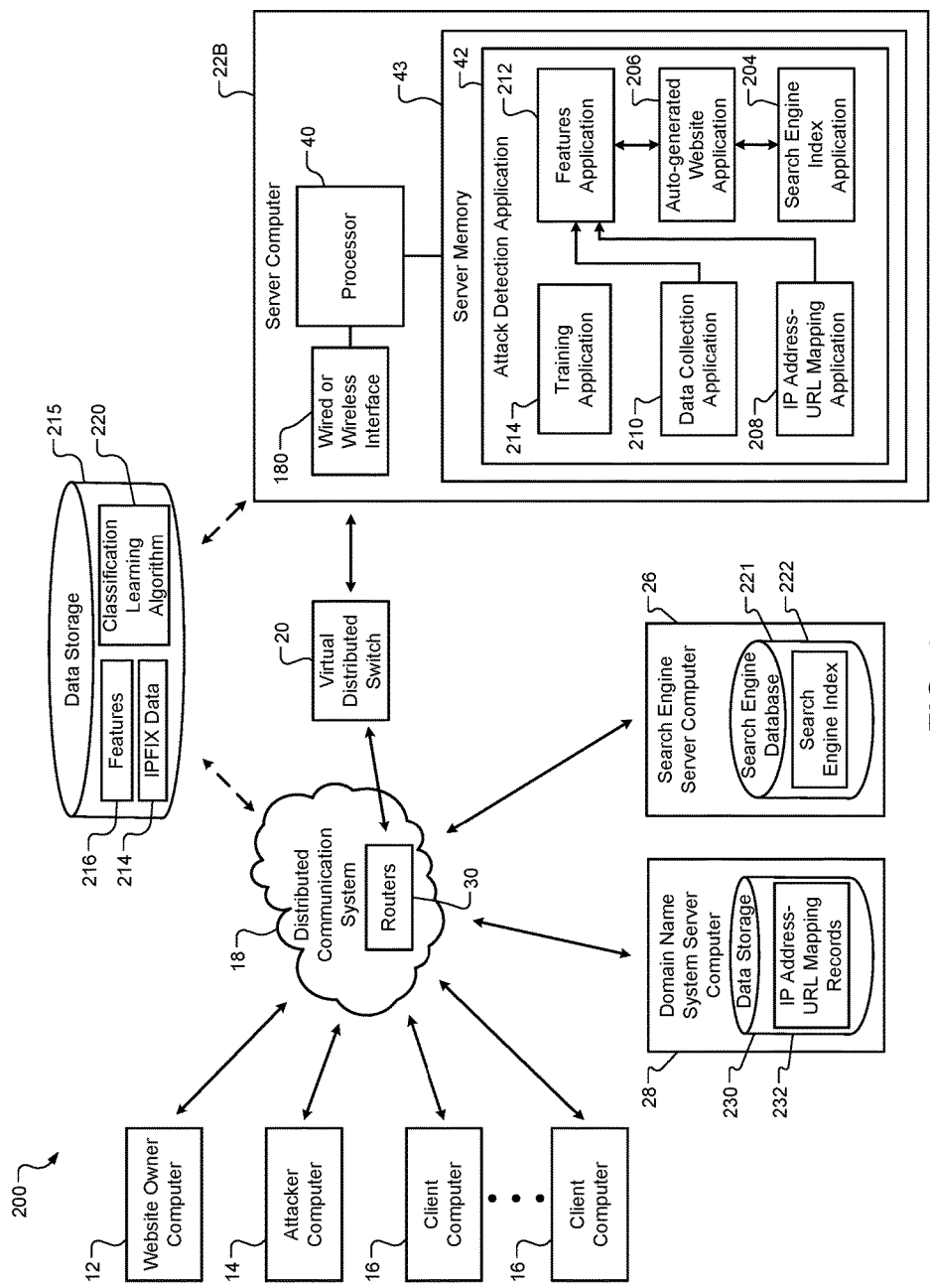
FIG. 4 is a functional block diagram of a portion of the attack detection system of FIG. 1 illustrating attack detection applications.

FIG. 4 shows a portion 200 of the attack detection system 10 of FIG. 1. The portion 200 includes the computers 12, 14, 16, the distributed communication system 18, the virtual distributed switch 20, the server computer 22B, the search engine server computer 26, and the DNS server computer 28. The processor 40 of the server computer 22B executes the attack detection application 42. The attack detection application 42 may be implemented as a single application and includes sub-routines (or sub-applications). Each sub-application may be included as part of the attack detection application 42 or may be implemented separate from the attack detection application. As an example, the attack detection application 42 may include a search engine index application 204, an auto-generated website application 206, an IP address-URL mapping application 208, a data collection application 210, a features application 212 and a training application 214.

The data collection application 210 collects IPFIX data 214 from packets transmitted between the computers 12, 14, 16 and the server computers 22 via the virtual distributed switch 20. The IPFIX data 214 or portions thereof may be stored in the server memory 43 and/or in a data storage 215. Examples of the data storage 215 are the data storages 188 and 192 of FIG. 3. The features application 212 determines features 216, such as non-machine specific features and machine specific features. A machine referring to a VM or a PM. Some non-machine specific features are described below with respect to operation 308 of FIG. 5. Some machine specific features are described below with respect to operation 310 of FIG. 5. The training application 218 is used to train a classification learning algorithm 220. The features 216 and the classification learning algorithm 220 or portions thereof may also be stored in the memory 43 and/or the data storage 215.

The search engine server computer 26 includes a search engine database 221 that stores a search engine index 222. The search engine index 222 is generated by a search engine, such as Bing®, Google®, Yahoo®, etc. The search engine index 222 may include copies of website pages accessed by the search engine server computer 26 during crawling sessions of the search engine server computer 26 on the Internet. The website pages that are auto-generated by a website building tool, such as WordPress®, Wix®, Weebly®, Squarespace®, Shopify®, BigCommerce® and/or other website building tools and/or generators, include meta-tags in hypertext markup language (HTML) elements of the website pages. The meta-tags are indicative of the websites being auto-generated by one of the website building tools. Portions (e.g., keywords) of the meta-tags may be included in the search engine index 222 and used to quickly find the websites being auto-generated.

The DNS server computer 28 includes a data storage 230 that stores IP address-URL mapping records 232. The IP address-URL mapping records 232 map IP addresses to URLs. The records may be data specific, such that each of the records relates an IP address to one or more URLs for a specific date. As an example, a first record may indicate that an IP address corresponded to a first one or more URLs on a first date. A second record may indicate that the IP address corresponded to a second one or more URLs on a second date.

Figure 5:
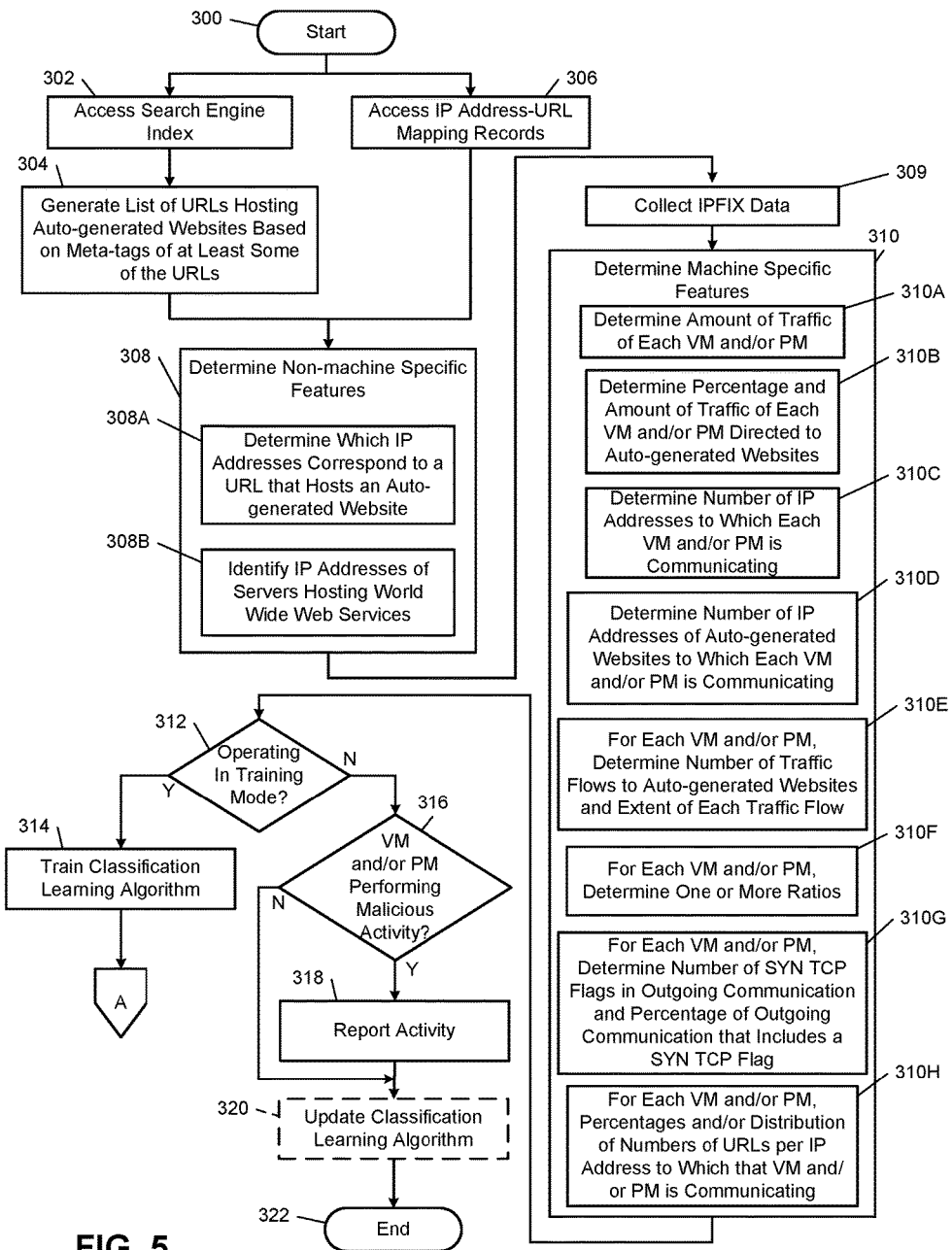
FIG. 5 illustrates an attack detection method in accordance with an embodiment of the present disclosure.

Operations of the computers 12, 14, 16, the routers 30, the virtual distributed switch 20, the server computers 22A, 22B, 26 and the DNS server computer 28 of FIGS. 1-4 are further described below with respect to the methods of FIGS. 5-6. An example of an attack detection method is illustrated in FIG. 5. Although the following operations are primarily described with respect to the implementations of FIGS. 1-4, the operations may be modified to apply to other implementations of the present disclosure. The operations may be iteratively performed.

The method begins at 300 and includes execution of the attack detection application 42 by the processor 40. At 302, the search engine index application 204 accesses the search engine index 222 to begin searching for websites having meta-tags indicating that the websites are auto-generated websites. At 304, the auto-generated website application 206 determines which URLs in the search engine index 222 correspond to auto-generated websites. The URL of each website that has a meta-tag indicating the website is auto-generated by a website building tool is added to a list of URLs. At 306, the IP address-URL mapping application 208 accesses the IP address-URL mapping records 232 to determine IP addresses of URLs. The URLs may include the URLs in the list of URLs and other URLs. In one embodiment, the IP address-URL mapping application 208 accesses only the records that include the URLs in the list of URLs. Operation 306 may include creating an IP address-URL mapping table relating IP addresses to URLs.

At 308, the features application 212 determines non-machine specific features. Each of the non-machine specific features may be determined based on the list of URLs and/or the IP address-URL mapping records 232. As a first example, at 308A, the features application 212, if not already identified at 306, identifies IP addresses of VMs and/or PMs that host auto-generated websites. The identification of the IP addresses is performed based on the list of URLs and the IP address-URL mapping records 232. The IP addresses that correspond to the URLs and are included in the list of URLs are identified as IP addresses of VMs and/or PMs hosting auto-generated websites. A list of IP addresses of VMs and/or PMs hosting auto-generated websites may be created. In one embodiment, each of the IP address-URL mapping records 232 that has an IP address in the list of IP addresses is tagged, for example with a '1', to indicate that the IP address and/or record corresponds to a VM and/or PM hosting an auto-generated website. In an alternative example embodiment, the IP addresses in the IP address-URL mapping records 232 are included in an IP address table. Each of the entries and/or rows of the IP address table that has an IP address in the list of IP addresses is tagged, for example with a '1', to indicate that the IP address and/or row corresponds to a VM and/or PM hosting an auto-generated website.

At 308B, the features application 212 identifies IP addresses of server computers hosting World Wide Web (WWW) services. Examples of server computers providing WWW services are server computers implemented as part of a Microsoft® Azure® cloud computing platform, an Amazon® cloud computing platform, or other cloud computing platform. This may include counting a number of URLs corresponding to each IP address in the IP address-URL mapping records 232. The more URLs that correspond to a single IP address, the more likely the IP address is an address of a server computer hosting a WWW service. The WWW services may include hosting services associated with auto-generated websites. If the IP address is associated with a sever computer hosting a WWW service, the IP address is more likely to be under attack. Thus, if a VM has a large amount of traffic directed at an IP address of a server computer hosting a WWW service, the VM is likely performing brute-force attacks and/or malicious activity.

At 309, the data collection application 210 collects IPFIX data 214 from packets transmitted between the computers 12, 14, 16 and the $VM_{1-N}$ and/or PMs. The IPFIX data 214 may be stored in the server memory 43 and/or in the data storage 215.

At 310, the features application 212 determines machine specific features. Each of the machine specific features may be determined based on the list of URLs, the list of IP addresses, the non-machine specific features, and/or the IPFIX data 214. Examples of machine specific features are determined during operations 310A-310H. At 310A, the features application 212 is configured to cause the processor of the server computer 22B to determine an amount of traffic for each VM and/or PM being monitored based on the list of URLs, the non-machine specific features, and/or the IPFIX data 214. For example, the amount of traffic may be monitored between (i) each of the VMs and/or PMs and (ii) one or more computers. This may include monitoring traffic to each VM and/or PM associated with one or more server computers. The one or more server computers may correspond to and/or are able to be monitored by the attack detection application 42.

At 310B, the features application 212 determines a percentage and/or an amount of traffic of each VM and/or PM being monitored and corresponding to auto-generated websites. This may be based on the list of URLs, the non-machine specific features, and/or the IPFIX data 214. The percentage refers to an amount of traffic of a VM and/or PM corresponding to auto-generated websites relative to a total amount of traffic for that VM and/or PM. The higher the percentage, the more likely the VM and/or PM is scanning VMs and/or PMs to perform brute-force attacks and/or malicious activity. As an example, a VM and/or PM may have a normal (i.e. expected or predetermined) percentage (e.g., 20%) of traffic directed to auto-generated websites. If a user is browsing the Internet in a random manner, then the percentage should be at the normal percentage and/or not more than a predetermined amount above the normal percentage. If the percentage of auto-generated website traffic is greater than 20% and/or more than the predetermined amount above the normal percentage, then the VM and/or PM is likely scanning VMs and/or PMs to perform brute-force attacks and/or malicious activity. A list of VMs and/or PMs having a large percentage of traffic directed to IP addresses of VMs and/or PMs hosting auto-generated websites may be generated. For example, if the percentage of traffic of a VM and/or PM that is directed to IP addresses of VMs and/or PMs hosting auto-generated websites is greater than a predetermined percentage, then the IP address of that VM and/or PM is added to the list of VMs and/or PMs.

At 310C, the features application 212 determines, for each VM and/or PM, a number of IP addresses to which that VM and/or PM is communicating. This may be based on the list of URLs, the list of IP addresses, and the IPFIX data 214. The features application 212 may compare the IP addresses indicated in the IPFIX data 214 to the IP addresses in the list of IP addresses. The more IP addresses the VM and/or PM is communicating with, the more likely the VM and/or PM is performing malicious activity.

At 310D, the features application 212 determines, for each VM and/or PM, a number of IP addresses of auto-generated websites to which that VM and/or PM is communicating. This may be based on the IP addresses in the IPFIX data 214 and the IP addresses of the URLs in the list of URLs. The more IP addresses of auto-generated websites to which a VM and/or PM is communicating, the more likely that VM and/or PM is performing brute-force attacks and/or other malicious activity.

At 310E, the features application 212 determines, for each VM and/or PM, a number of traffic flows (e.g., number of sequences of packets) to auto-generated websites and an extent of each of the traffic flows. The extent of each of the traffic flows may refer to: lengths of the sequences of packets; amounts of time to transmit the sequences of packets; and/or lengths of communication periods over which the VM and/or PM is communicating with the VMs and/or PMs of the auto-generated websites. As an example, if communication with a VM and/or PM is long, then there may be a small number of long traffic flows to the VM and/or PM and a small number of IP addresses involved in the communication. If a VM and/or PM is scanning a large number of VMs and/or PMs and sending a user ID and password to a large number of IP addresses, then there are a large number of short traffic flows and a large number of IP addresses.

At 310F, the features application 212 determines, for each VM and/or PM, one or more ratios. Examples of ratios that may be determined are: (i) a ratio between the number of IP addresses to which the VM and/or PM is communicating and the number of traffic flows to VMs and/or PMs hosting auto-generated websites; (ii) a ratio between the number of IP addresses of VMs and/or PMs hosting auto-generated websites to which the VM and/or PM is communicating and a total number of traffic flows to VMs and/or PMs hosting auto-generated websites; (iii) a ratio between a number of traffic flows to auto-generated websites and a total number of traffic flows; and (iv) a ratio between the number of IP addresses of VMs and/or PMs hosting auto-generated websites and a total number of IP addresses to which the VM and/or PM is communicating. The features application 212 may determine, for each VM and/or PM, numbers of traffic flows to each VM and/or PM hosting an auto-generated website. This would include ratios of a number of traffic flows per VM and/or PM hosting an auto-generate website.

At 310G, the features application 212 determines for each VM and/or PM (i) a number of SYN TCP flags in outgoing communication (i.e. outgoing traffic flows), and (ii) a percentage of outgoing communication (i.e. percentage of outgoing traffic flows) that includes a SYN TCP flag. A SYN TCP flag may refer to a bit in a header of a packet, which indicates the source (e.g., a first computer and/or first VM and/or PM) that generated the packet is initiating communication with a destination (e.g., second computer and/or second VM and/or PM). The higher the number of SYN TCP flags in outgoing communication of a VM and/or PM, the more likely the VM and/or PM is performing brute force attacks and/or malicious activity.

At 310H, the features application 212 determines, for each VM and/or PM, percentages of the number of URLs per IP address to which that VM and/or PM is communicating. A distribution of the percentages may be generated and indicate the amounts of URLs per IP address to which a VM and/or PM is communicating. The percentages may be determined and/or the distribution may be generated based on one or more of the above-described features.

Operations 310A-310H are provided as examples. Other features may be determined. For example, percentages of communication of one or more VMs and/or PMs directed to URLs and/or IP addresses of auto-generated websites may be determined. A distribution of percentages may be generated, where each percentage is an amount of communication to a URL and/or a corresponding IP address of an auto-generated website relative to a total amount of communication of the one or more VMs and/or PMs. The percentages may be determined and/or the distribution may be generated based on one or more of the above-described features.

At 312, the attack detection application 42, when operating in a training mode, may perform operation 314. If the attack detection application 42 is not operating in a training mode, operation 316 may be performed. At 314, the training application 218 may perform a training process to train the classification learning algorithm 220. This may include performing operations 352-356 of the training method described below with respect to FIG. 6.

At 316, the attack detection application 42 may determine based on the non-machine specific features, the machine specific features and the classification learning algorithm whether one or more of the VMs and/or PMs are performing brute-force attacks and/or malicious activity. If one or more of the VMs and/or PMs are performing brute-force attacks and/or malicious activity, operation 318 is performed, otherwise operation 320 is performed. This may include entering values for the features determined during operations 308 and 310 into the classification learning algorithm and the classification learning algorithm providing values (i) indicative of whether each of the VMs and/or PMs is performing brute-force attacks and/or malicious activity, and/or (ii) indicative of probabilities that the VMs and/or PMs are performing brute-force attacks and/or malicious activity. These values may be reported during operation 318. In some examples, the classification learning algorithm refers to and/or includes a random forest algorithm, a gradient boosted tree learning algorithm, a logistic regression algorithm, and/or other suitable algorithm.

As a simplified example, the classification learning algorithm may include multiplying each of the values of the features by respective predetermined weight values, summing the resultant weighted values, and comparing the sum to a predetermined threshold. If the sum is greater than the predetermined threshold, then the VM and/or PM may be determined to be performing brute-force attacks and/or malicious activity. In one embodiment, the classification learning algorithm includes labels for the VMs and/or PMs, where each label indicates a probability that the corresponding VM and/or PM is performing or not performing brute-force attacks at specific dates and times. The brute-force attacks may refer to application level brute-force attacks. In one embodiment, the labels are a '1' if the VM and/or PM is likely performing brute-force attacks or a '0' if the VM and/or PM is likely not performing brute-force attacks.

At 318, the attack detection application 42 reports to the owner(s) of the one or more VMs and/or PMs, performing the brute-force attacks and/or malicious activity, information pertaining to the corresponding brute-force attacks and/or malicious activity. This may include sending signals indicating the information to the computer(s) of the owner(s), VM(s) and/or PM(s) that have been attacked. The information may: identify the VM(s) and/or PM(s) performing the brute force attacks and/or malicious activity; identify the VM(s) and/or PM(s) that have been attacked; include the values determined during operation 316; and identify the non-machine specific features, the machine specific features and/or other parameters. The attack detection application 42, the computers of the owner(s), the VM(s) and/or the PM(s) that have been attacked may then cease and/or limit operation of the VM(s) and/or PM(s) performing the brute-force attacks and/or the malicious activity based on the information. The attack detection application 42, the computer(s) of the owner(s), the VM(s) and/or PM(s) that have been attacked may block access to the VM(s) and/or PM(s) that have been attacked and/or access to the auto-generated websites. These and other countermeasures may be performed based on the information.

At 320, the training application 218 and/or the attack detection application 42 updates the classification learning algorithm based on results of operation 316. This may be performed similarly to operation 356 of the method of FIG. 6. The method of FIG. 5 may end at 322.

Figure 6:
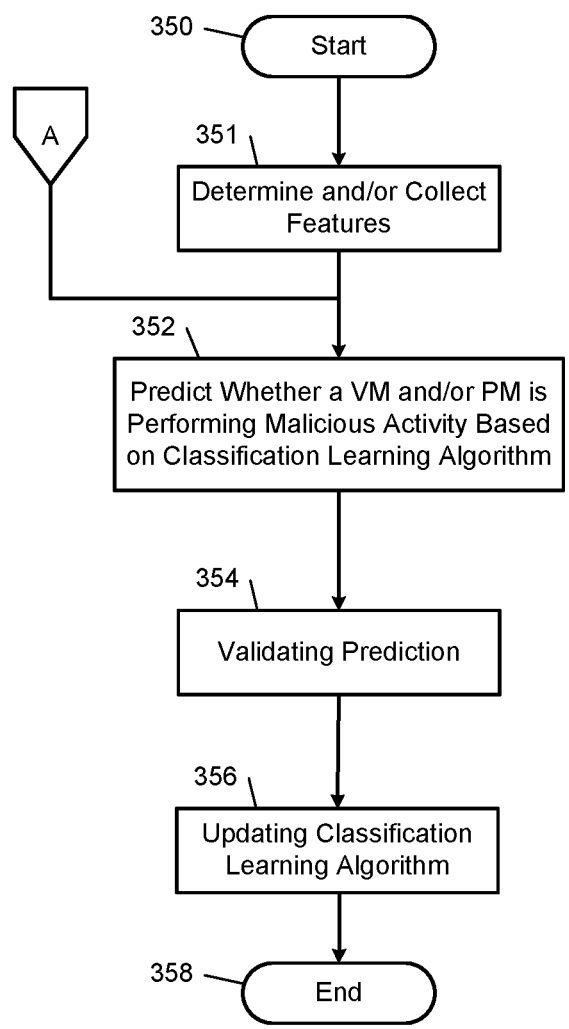
FIG. 6 illustrates a training method in accordance with an embodiment of the present disclosure.

In FIG. 6, a training method is shown. The training method is performed to build a database of historical data and corresponding labels for accurate determinations of whether a VM and/or PM is performing a brute-force attack and/or malicious activity. The operations of FIG. 6 may be iteratively performed. The method may begin at 350. At 351, the applications 42, 204, 206, 208, 210, 212, 218 determine and/or collect the features if not already collected. The features may include the non-machine specific features and/or the machine specific features. The features may be determined and/or collected as described above with respect to the operations 302-310 of the method of FIG. 5.

At 352, the training application 218 predicts whether each of the VMs and/or PMs is performing brute-force attacks and/or malicious activity based on the classification learning algorithm. This may be performed as described above with respect to operation 316 of FIG. 5 and may be based on previous predictions, labels and corresponding feature values. The classification learning algorithm may include a table of historical data. The table of historical data includes rows and columns, where: each row refers to a set of data samples for a VM and/or PM and includes a label for each data sample; and each column refers to a respective one of the described features. The label may be a binary value of '1' or '0' indicating a prediction of whether the VM and/or PM is performing a brute-force attack and/or malicious activity.

At 354, the training application 218 validates the prediction values determined during operation 352. This may include the training application 218 generating and transmitting signals to the VMs and/or PMs and/or computers of the owners of the VMs to confirm one or more of the features. The training application 218 may receive response signals from the VMs and/or PMs and/or the computers of the owners of the VMs. The training application 218 may then validate the prediction values based on the response signals. For example, if a response signal indicates that the VM and/or PM should not be communicating as indicated by one or more of the feature values, then the training application 218 may confirm that a prediction value indicating the VM and/or PM is performing a brute-force attack and/or malicious activity is accurate. If a response signal indicates that the VM and/or PM should be communicating as indicated by the one or more of the feature values, then the training application 218 may change the prediction value to indicate no malicious activity.

The training application 218 may cause the processor to signal security experts (e.g., a service provider monitoring activity of VMs and/or PMs), VM owners and/or PM owners to obtain feedback on normal behavior of VMs and/or PMs of concern that may be performing brute-force attacks and/or malicious activity. The training application 218 may also request forensic data be collected to determine whether the predictions are accurate. The security experts and/or owners may indicate whether the determined features are accurate and/or expected for the corresponding VMs and/or PMs. If the security experts and/or the owners indicate that this is normal activity, then the predicted value is changed to indicate no brute-force attack and/or malicious activity exists for the VMs and/or PMs. If the security experts and/or the owners indicate that this is not normal activity, then the predicted value may not be changed.

At 356, the training application 218 updates the classification learning algorithm based on the results of the validation performed at 354. This may include updating the labels and/or other prediction values. If the label associated with a set of features and a VM and/or PM matches results of the validation, then the label may not be updated and may remain the same. If the label associated with the set of features and the VM and/or PM does not match results of the validation, then the label may be updated. The set of features may include one or more of the above-described non-machine specific features and machine specific features. The method may end at 358.

The above-described operations of FIGS. 5-6 are meant to be illustrative examples; the operations may be performed sequentially, synchronously, simultaneously, continuously, during overlapping time periods or in a different order depending upon the application. Also, any of the operations may not be performed or skipped depending on the implementation and/or sequence of events.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

A processor may refer to a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The processor may include one or more interface circuits. In some examples, the interface circuits may include wired or wireless interfaces that are connected to a local area network (LAN), the Internet, a wide area network (WAN), or combinations thereof. The functionality of any given processor of the present disclosure may be distributed among multiple circuits that are connected via interface circuits. For example, multiple circuits may allow load balancing.

The term code, as used above, may include software, firmware, and/or microcode, and may refer to programs, routines, functions, classes, data structures, and/or objects. The term shared processor circuit encompasses a single processor circuit that executes some or all code from multiple circuits. The term group processor circuit encompasses a processor circuit that, in combination with additional processor circuits, executes some or all code from one or more circuits. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple circuits. The term group memory circuit encompasses a memory circuit that, in combination with additional memories, stores some or all code from one or more circuits.

The term memory or memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encode instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as JavaScript Object Notation (JSON), hypertext markup language (HTML) or extensible markup language (XML), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system for detecting an attack by a first virtual or physical machine on one or more auto-generated websites, the system comprising:
    a processor;
    a memory; and
    an application stored in the memory and including instructions, which are executable by the processor and that are configured to
        access an index of a search engine server computer and determine uniform resource locators (URLs) of a plurality of auto-generated websites, wherein the plurality of auto-generated websites include the one or more auto-generated websites;
        access a plurality of Internet protocol (IP) address-URL entries stored in a domain name system server computer;
        determine a first feature based on the URLs of the plurality of auto-generated websites and the IP address-URL entries, wherein the application, in determining the first feature, (i) determines which IP addresses in the IP address-URL entries are associated with hosting one of the plurality of auto-generated websites, and (ii) for each IP address in the IP address-URL entries, counts a number of corresponding URLs;
        collect header data of packets transmitted to or received from the first virtual or physical machine;
        determine a second feature based on the first feature and the header data;
        based on the second feature, generate a value indicative of whether the first virtual or physical machine has attacked the one or more auto-generated websites; and
        perform a countermeasure based on the value.

2. The system of claim 1, wherein:
the header data includes Internet protocol flow information export (IPFIX) data; and
the application causes the processor to determine the second feature based on the IPFIX data.

3. The system of claim 1, wherein:
the application is configured to determine a first plurality of features;
the first plurality of features include the first feature;
the application is configured to
    collect Internet protocol flow information export (IPFIX) data in headers of the packets transmitted to or received from the first virtual or physical machine;
    determine a second plurality of features based on (i) the first plurality of features, and (ii) the IPFIX data; and
    based on the second plurality of features, generate the value indicative of whether the first virtual or physical machine has attacked the one or more auto-generated websites.

4. The system of claim 3, wherein the application, in determining the second plurality of features:
    determines a total number of IP addresses to which the first virtual or physical machine is communicating;
    determines a number of IP addresses of auto-generated websites to which the first virtual or physical machine is communicating;
    determines a ratio between the total number of IP addresses and the number of IP addresses of auto-generated websites to which the first virtual or physical machine is communicating;

determines a number of synchronization transmission control protocol flags in outgoing communication of the first virtual or physical machine; and determines percentages of URLs corresponding to each IP address to which the first virtual or physical machine is communicating.

5. The system of claim 1, wherein the application is configured to generate the value indicative of whether the first virtual or physical machine has attacked the one or more auto-generated websites based on a classification learning algorithm.

6. The system of claim 5, wherein the classification learning algorithm is a gradient boosted tree learning algorithm.

7. The system of claim 1, wherein the application is configured to:

collect header data of packets transmitted to or received from a second virtual or physical machine;

determine a third feature based on the first feature and the header data;

based on the third feature, generate a second value indicative of whether the second virtual or physical machine has attacked one of the plurality of auto-generated websites; and perform the countermeasure based on the second value.

8. A tangible computer readable device storing instructions executable by a processor for detecting an attack by a first virtual or physical machine on one or more auto-generated websites, the instructions comprising:

determining uniform resource locators (URLs) of a plurality of auto-generated websites based on an index of a search engine server computer, wherein the plurality of auto-generated websites include the one or more auto-generated websites;

accessing a plurality of Internet protocol (IP) address-URL entries in a domain name system server computer;

determining a first feature based on the URLs of the plurality of auto-generated websites and the IP address-URL entries, wherein determining the first feature includes (i) determining which IP addresses in the IP address-URL entries are associated with hosting one of the plurality of auto-generated websites, and (ii) for each IP address in the IP address-URL entries, counting a number of corresponding URLs;

collecting header data of packets transmitted to or received from the first virtual or physical machine;

determining a second feature based on the first feature and the header data;

based on the second feature, generating a value indicative of whether the first virtual or physical machine has attacked the one or more auto-generated websites; and performing a countermeasure based on the value.

9. The tangible computer readable device of claim 8, further comprising instructions for determining the second feature based on Internet protocol flow information export (IPFIX) data, wherein the header data includes the IPFIX data.

10. The tangible computer readable device of claim 8, further comprising instructions for:

determining a first plurality of features, wherein the first plurality of features include the first feature;

collecting Internet protocol flow information export (IPFIX) data in headers of the packets transmitted to or received from the first virtual or physical machine;

determining a second plurality of features based on (i) the first plurality of features, and (ii) the IPFIX data; and based on the second plurality of features, generating the value indicative of whether the first virtual or physical machine has attacked the one or more auto-generated websites.

11. The tangible computer readable device of claim 10, wherein determining the second plurality of features includes:

determining a total number of IP addresses to which the first virtual or physical machine is communicating;

determining a number of IP addresses of auto-generated websites to which the first virtual or physical machine is communicating;

determining a ratio between the total number of IP addresses and the number of IP addresses of auto-generated websites to which the first virtual or physical machine is communicating;

determining a number of synchronization transmission control protocol flags in outgoing communication of the first virtual or physical machine; and determining percentages of URLs corresponding to each IP address to which the first virtual or physical machine is communicating.

12. The tangible computer readable device of claim 8, further comprising instructions for generating the value indicative of whether the first virtual or physical machine has attacked the one or more auto-generated websites based on a classification learning algorithm.

13. The tangible computer readable device of claim 12, wherein the classification learning algorithm is a gradient boosted tree learning algorithm.

14. The tangible computer readable device of claim 8, further comprising instructions for:

collecting header data of packets transmitted to or received from a second virtual or physical machine;

determining a third feature based on the first feature and the header data;

based on the third feature, generating a second value indicative of whether the second virtual or physical machine has attacked one of the plurality of auto-generated websites; and performing the countermeasure based on the second value.

* * * * *